March 22, 1966  E. R. MICHALIK  3,241,939
METHOD OF MANUFACTURE OF FLAT GLASS
Filed Jan. 15, 1963  5 Sheets-Sheet 1

INVENTOR.
EDMUND R. MICHALIK
BY Oscar H. Spencer
ATTORNEY

INVENTOR.
EDMUND R. MICHALIK
BY
Oscar L. Spencer
ATTORNEY

March 22, 1966  E. R. MICHALIK  3,241,939

METHOD OF MANUFACTURE OF FLAT GLASS

Filed Jan. 15, 1963  5 Sheets-Sheet 3

INVENTOR.
EDMUND R. MICHALIK
BY
Oscar L. Spencer
ATTORNEY

March 22, 1966  E. R. MICHALIK  3,241,939
METHOD OF MANUFACTURE OF FLAT GLASS
Filed Jan. 15, 1963  5 Sheets-Sheet 4

INVENTOR.
EDMUND R. MICHALIK
BY
Oscar L. Spencer
ATTORNEY

March 22, 1966 E. R. MICHALIK 3,241,939
METHOD OF MANUFACTURE OF FLAT GLASS
Filed Jan. 15, 1963 5 Sheets-Sheet 5

INVENTOR.
EDMUND R. MICHALIK
BY
Oscar L. Spencer
ATTORNEY

United States Patent Office 3,241,939
Patented Mar. 22, 1966

3,241,939
METHOD OF MANUFACTURE OF FLAT GLASS
Edmund R. Michalik, West Mifflin, Pa., assignor to Pittsburgh Plate Glass Company, Pittsburgh, Pa., a corporation of Pennsylvania
Filed Jan. 15, 1963, Ser. No. 251,682
17 Claims. (Cl. 65—99)

This application is a continuation-in-part of my copending application Ser. No. 188,664, filed April 19, 1962, entitled Manufacture of Glass, now abandoned.

This application relates to the manufacture of flat glass by floating glass on a liquid bath, such as molten metal, so that the resultant flat glass has finished surfaces requiring little or no additional surfacing for ultimate use.

It has been proposed heretofore to produce flat glass by floating a ribbon or sheet of glass upon the surface of a bath of molten metal. The product produced by this process has surfaces which differ somewhat from each other. The top surface thereof, because of the heat involved, has a fire-finished surface. The bottom of the ribbon in contact with the molten metal is flat and has a surface having a similar appearance to a fire-finished surface.

When producing flat glass of compositions approaching that of commercial plate and window glass or like soda-lime glasses and using a molten metal such as a bath of tin or tin alloy, molten glass poured directly onto the bath of metal ultimately will attain an equilibrium thickness of approximately ¼ inch (hereinafter sometimes called "equilibrium thickness"). Even a preformed ribbon of glass of a thickness different from the equilibrium thickness when remelted while supported on the molten metal, will nevertheless seek the equilibrium thickness. Heretofore, when thinner glasses were desired, it was considered necessary to attenuate the ribbon of glass while in molten condition to produce thicknesses of glass differing from the equilibrium thickness or to subject a stiffened ribbon or sheet of a different dimension to only a surface melting treatment. Attenuation of the glass introduces speed change problems with resultant dependent variables, such as ribbon width, glass tank gradient, etc. The attenuated glass is also inclined to have surfaces of inferior quality because of localized temperature differences which result in non-uniform attenuation.

The need for glass of thicknesses different from the equilibrium thickness is great. For example, the majority of laminated glass assemblies useable in the automotive industry are constructed of two pieces of glass of a thickness less than the equilibrium thickness (usually of the order of ³⁄₁₆ or ⅛ inch) with a layer of plastic sandwiched therebetween.

According to this invention, it has been found that glass of conventional plate and window composition and of any desired thickness different from the described equilibrium thickness can be produced by floating a sheet or ribbon of glass on the surface of a molten bath of metal such as tin or tin alloy having a density greater than that of the glass and holding the glass at a melting temperature while modifying the apparent weight density of the glass with respect to the weight density of the metal of the bath, for example, by changing the degree of immersion of the glass in the metal. Thus, it has now been found that when the glass displaces a greater quantity of metal than that usually displaced under normal atmospheric conditions, the molten glass tends to stabilize at a thinner thickness than the equilibrium thickness. Thus, modifying the degree of immersion of the glass in the metal results in a modification of the amount of metal displaced by the glass which may be greater or less than that usually displaced dependent on the modification exacted.

Modification of the apparent weight density of the glass with respect to that of the metal may be accomplished effectively by selectively applying a fluid pressure over the major portion of the glass which is different from the fluid pressure which is applied to the surface of the metal at an edge of the glass or preferably at a pair of opposed edges of the glass sheet. For most purposes, it is found preferable to apply this different fluid pressure only to a portion of the surface of the glass sheet leaving a margin, generally a pair of opposed margins of the glass sheet, exposed to another fluid pressure which may be the same as or different from that applied to the metal surface at the glass edge.

By selecting the magnitude of the pressure on the central areas of the glass and supplying a ribbon of desired thickness to the bath, the maintenance of this desired glass thickness is insured. If a ribbon of a thickness other than that which is desired is supplied to the metal bath then, because of the characteristic of molten glass to flow, a ribbon of the desired thickness can be produced by proper selection of the pressure which modifies the apparent densities of the glass with respect to the bath. Because of the temperatures involved, the glass attains surfaces characteristic of fire-finished surfaces, so that little or no subsequent abrasive surfacing is required for ultimate use.

When the treated glass is cooled sufficiently, it is withdrawn from the metal bath without surface damage due to equipment contact, as by applying only a tractive force to the glass ribbon. Since attenuation of the glass becomes less important, special apparatus within the confines of the metal bath or contiguous thereto to contact the glass surfaces and mar them is not required in contrast to previous processes. The process is an equilibrium process for controlling thickness because all variables become constant and there are no temperature gradient thickness variations in the finished ribbon.

Thus, a desired thickness of glass can be manufactured in ribbon form in a simple manner with low losses due to unuseable, defective, glass.

According to an effective method of practicing the invention, a ribbon of glass is presized as to thickness and width by convenient means, such as by passing molten glass through a slot or between sizing rolls and cooling the ribbon to stabilize its dimensions. This ribbon is then passed to a pool of molten metal having a greater density than that of the ribbon and the ribbon is floated on the surface of the metal during its movement thereacross. A super-atmospheric pressure is applied to the upper surface of a central area of the ribbon while providing adequate marginal seals, so that the fluid pressure on the metal surface at the side edges of the glass and preferably on the margins of the ribbon is atmospheric. At the same time the temperature of the ribbon is raised to a melting temperature. After the surfaces of the ribbon have improved, i.e., smoothed out, and surface defects have been eliminated or reduced in magnitude or number, the ribbon is cooled to a stiffened state and is removed from the metal.

According to a further embodiment, the glass may be delivered to the surface of the molten bath in a molten or substantially molten state and held molten until it has stabilized and the surface thereof has become smooth. The molten glass may be delivered directly to the pool of molten metal from a melting furnace and the glass allowed to come to an equilibrium thickness under the applied pressure conditions contemplated here. Various differentials between the pressure applied to the central glass surface and that applied to the glass and the metal at the glass edge may be established as will become more apparent hereinafter.

To further describe the invention, attention is directed to the accompanying drawings in which like reference characters refer to like parts and in which.

Figure 1:
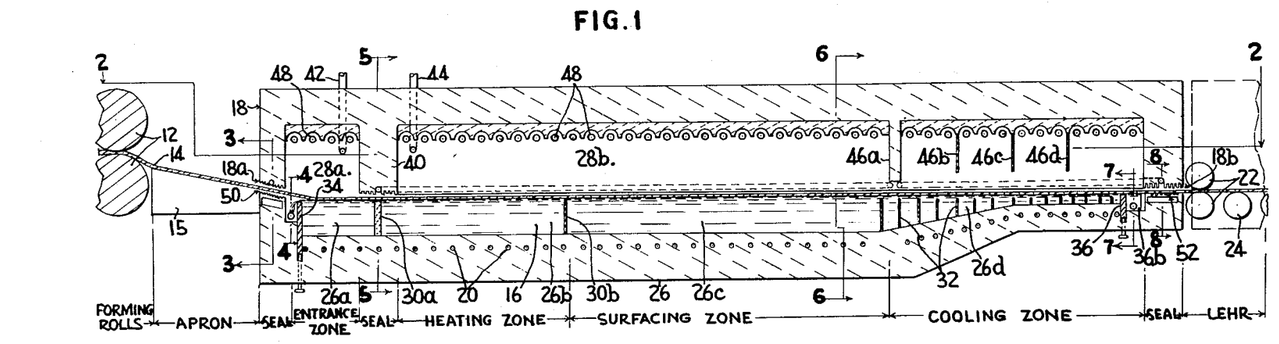
FIG. 1 is a longitudinal section of an apparatus for producing glass according to the inventive process herein contemplated showing means for selectively applying a super-atmospheric pressure to the top of a ribbon of glass supported on a molten metal bath.
Figure 2:
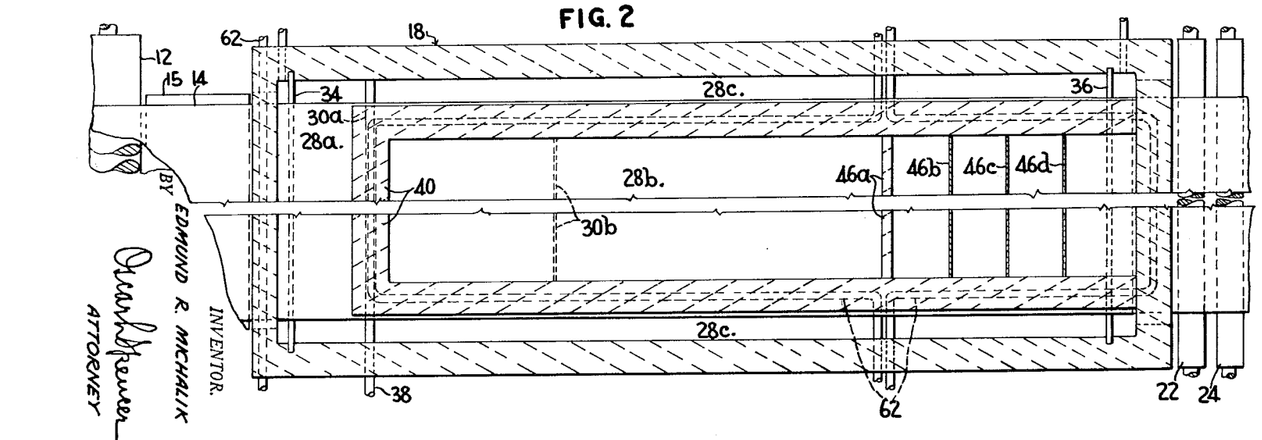
FIG. 2 is a horizontal sectional view taken on line 2—2 of FIG. 1 looking in the direction of the arrows showing a pair of forming rolls at the discharge end of a glass melting tank and the molten metal tank.
Figure 3:
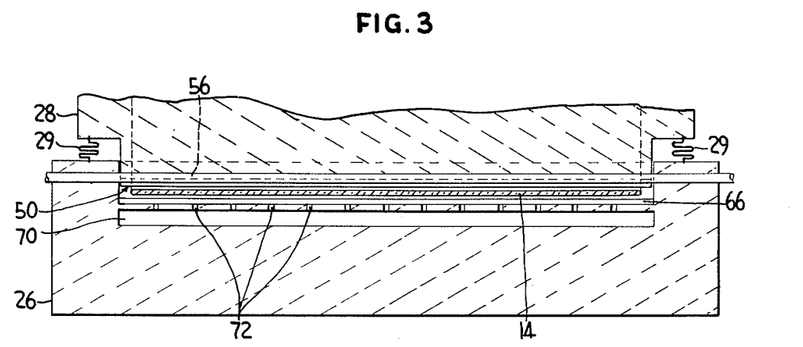
FIG. 3 is a sectional view taken on line 3—3 of FIG. 1 and in the direction of the arrows partly showing a seal at the entrance end of the molten metal tank.

With particular reference to the drawings, in FIG. 1 there is shown a pair of forming rolls 12 at the delivery end of a glass melting furnace of conventional construction (not shown) to form a ribbon of glass 14 which is delivered onto an apron arrangement 15 and thence onto the surface of a bath of molten metal 16 contained within a tank 18. The molten metal has a density greater than the glass ribbon 14, so that the ribbon floats on the surface of the molten metal. The metal may be tin, an alloy of tin, or the like.

The rolls may be of any convenient construction capable of delivering the ribbon. For example, they may be of metal, e.g., stainles steel or the like, and may be water-cooled in order to avoid sticking to the glass. In this case a careful control of roll temperature is important since, if the roll is too cold, the ribbon will be cooled unduly and a substantial length of the bath will be required to raise the ribbon to melting temperature. Preferably, the temperature of the ribbon should be held above 1650° F.

Graphite rolls or metal rolls coated with a layer of graphite also may be used. These have the advantage that graphite does not wet the glass even at melting temperature. However, an inert atmosphere should be maintained around the rolls to prevent their degradation. Rolls of other materials which do not wet molten glass or coated with such materials also may be used. Furthermore, the base rolls, whether cooled or uncooled, may be coated with molten tin or like immiscible metal to minimize sticking at high temperatures and thus to increase the temperature at which the ribbon may be delivered to the molten bath.

The contour of the rolls can be of consequence. Rolls having smooth cylindrical surfaces will, of course, deliver a flat ribbon of essentially uniform thickness. As will be apparent from the ensuing disclosure it is advantageous to use embossed mating rolls which deliver a ribbon which is substantially thicker at the edges than in the central portion. The advantages of delivering such a ribbon to a molten pool will be discussed in greater detail hereinafter.

In order to maintain the metal of the bath 16 in molten condition, thermal regulating means, such as electrodes 20 may be located in the floor of the tank 18, as illustrated, or may be submerged within the molten metal, so as to affect the temperature of the bath. The electrodes 20 are connected to a suitable source of power (not shown) in a conventional manner. Each electrode may be individually energized and controlled, so as to provide a desired thermal gradient within the various sections of the tank 18, as will be described. The glass ribbon 14, after treatment within the tank 18, is withdrawn from the tank without injury to its surfaces by traction or pinch rolls 22 onto a roller conveyor 24.

The tank 18 is constructed of a refractory bottom portion 26 and a refractory top portion 28, joined and sealed together, except for an entrance 18a and an exit 18b, by a suitable sealing means 29 (FIGS. 3, 5, 6 and 8). The sealing means illustrated is of a bellows type and permits the top portion 28 of the tank to be raised from the bottom portion 26 for repairs, etc., without the necessity of removing refractory parts and the subsequent repair of removed parts. The bottom portion 26 contains the molten metal 16 and is subdivided into an entrance zone 26a, a heating zone 26b, a surfacing zone 26c and a cooling zone 26d. These zones are defined by submerged walls or baffles 30a, 30b, and 30c, so built to materially reduce convection currents in the molten metal between the various zones. Other submerged baffles 32 are in the cooling zone to control convection currents in that zone. The level of the metal of the bath is controlled by a level control weir 34 at the entrance end of the tank 18, a level control weir 36 at the exit end of the tank and by an inlet 38. Preferably, the metal level is always maintained so that the glass ribbon being treated remains free of contact with any submerged wall or baffle within the tank 18. The inlet 38 (see FIG. 5) is located through a wall of the tank 18 and is connected to a suitable source of molten metal to supply molten metal to the tank 18. The level control arrangement of weirs 34 and 36 and other details of such control will be later described in detail.

The space between the top portion 28 and the surface of metal pool is divided into two chambers 28a and 28b by the front side of a circumferential wall 40. This wall depends from the roof 28 and has its side sections spaced from the walls of tank 18 thereby providing a gas space 28c along each side of the tank. This gas space 28c may in effect be a continuation or extension of chamber 28a.

A gas which is inert to the components of the bath, such as nitrogen or the like, is introduced, under pressure, into each gas chamber or pressure zone, through conduits 42 and 44, each connected to a suitable source of the pressurized gas (not shown). The gas is preferably heated, so as to eliminate chilling of the zones and the glass being treated. The pressure at which the gas is introduced into the zones 28a and 28c is different from the pressure of the gas introduced into the zone 28b, as will be later described in detail. The pressure zone 28b may be further subdivided by walls or baffles 46a, 46b, 46c and 46d for temperature control purposes.

Radiant heaters 48 are located adjacent the roof of the tank 18 to maintain the desired glass temperature between the exit and entrance ends of the tank. These radiant heaters 48, located in both pressure zones, as illustrated, are connected in a conventional manner to a source of electric power (not shown) and may be individually controlled for temperature gradient control. The control means is any conventional control means and need not be described and shown in detail. If necessary cooling means can be located above the cooling zone to insure the proper temperature of the glass being removed from the bath.

In order to maintain the pressures within the zones of the tank, and above the molten metal and prevent the leakage of the inert gas from the zones, various pressure seals are used. There are pressure seal arrangements 50 and 52 at the entrance and exit ends, respectively, of the tank 18. There is a pressure seal arrangement 54 associated with the wall 40 which subdivides the top portion 28 of the tank 18 into the pressure zones 28a, 28b and 28c. The top portion of pressure seal arrangements 50 and 52 (illustrated in FIG. 10) and the pressure seal arrangement 54 are similar in construction. Each includes a plurality of grooves 56 separated by lands 58, and a central or intermediate groove 60. The groove 60 receives a pipe 62 connected to a source of heated inert gas. The pipe 62 is provided with spaced orifices 64, so as to discharge a curtain of inert gas generally downwardly and toward or against the surface of the glass. As illustrated, there are two rows of orifices 64 spaced 90 degrees apart, each row discharging gas at an angle of approximately 45 degrees to the horizontal. The discharged gas flows outwardly and inwardly across the lands and grooves and the glass from its discharge location. The grooves cause turbulence in the discharge of gas and thus the gas flowing across the glass minimizes leakage of pressure gas from one zone to another or to the atmosphere or the entrance of atmospheric air into a pressure zone. The pressure of the gas is chosen to accomplish the pressure seal function.

To prevent undue chilling of the glass ribbon at least in the heating, and surfacing zones, the gas introduced into the pipes 62 adjacent those zones is heated to at least the temperature of the bath, while the gas introduced into pipes 62 adjacent the cooling zone need not be so heated. Thus, pipes 62a and 62b connected to pipes 62 and to the source of pressure gas at different temperatures are provided for supplying the different pressure gas.

Figure 10:
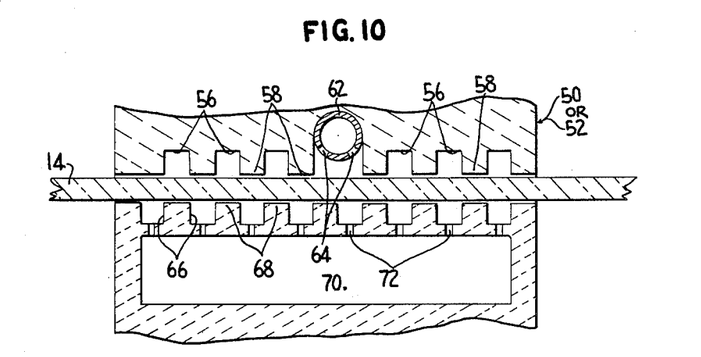
FIG. 10 is an enlarged view showing a typical pressure seal arrangement for the exit or entrance ends of the molten metal containing tank.
Figure 11:
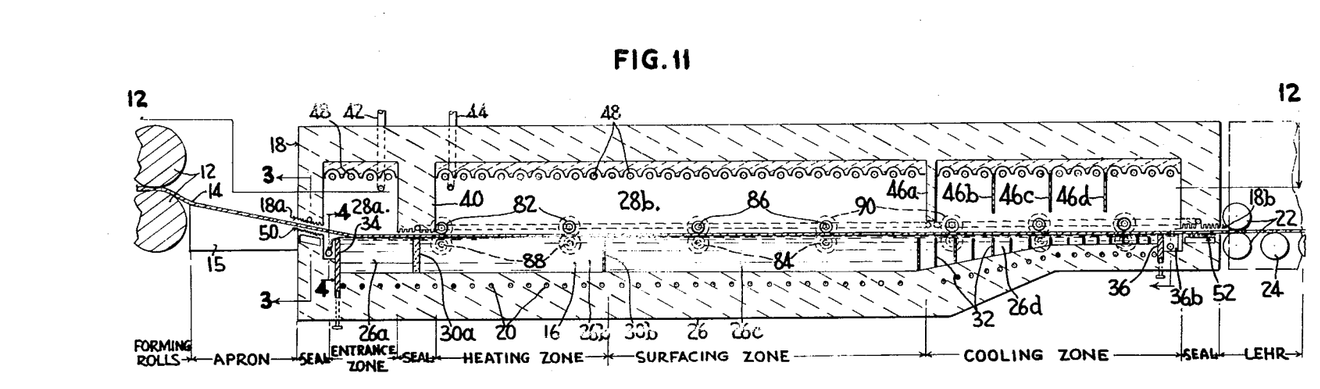
FIG. 11 is a longitudinal section similar to FIG. 1 showing edge gripping means for transporting the ribbon.
Figure 12:
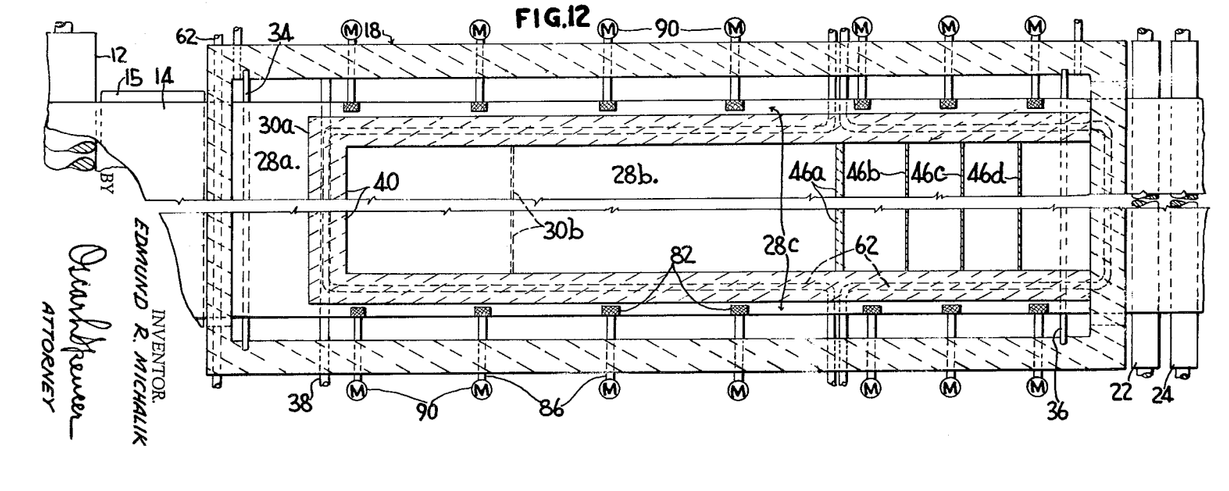
FIG. 12 is a horizontal section taken on line 12—12 of FIG. 11.

The entrance and exit seal arrangements 50 and 52 have a lower portion which also provides a gaseous support for the glass to prevent damage thereto from contact with the tank. Each lower portion includes a plurality of grooves 66 separated by lands 68, a plenum chamber 70 connected to a suitable source of inert gas under pressure, and a plurality of orifices 72 for passage of the gas from the plenum into the grooves. The lower seal arrangements can be constructed to be adjustable in vertical location. To accomplish this, they can be built on a taper with a screw adjustment. Thus, horizontal movement causes vertical location adjustment. Another arrangement is to construct the lower pressure seal as a unit or piston-like member fitting into a pressure chamber, so that variation in fluid pressure causes variations in vertical positioning.

The apron arrangement 15 may take several forms without departing from the spirit of the invention. For example, it may include a conventional series of rollers, as illustrated in U.S. Patent No. 1,954,077 to Gelstharp or it may be a slip table as illustrated in U.S. Patent No. 1,657,212 to Hitchcock or a gas support system as illustrated in the U.S. application of Michalik and Misson, Ser. No. 245,154, filed Dec. 17, 1962.

Figure 4:
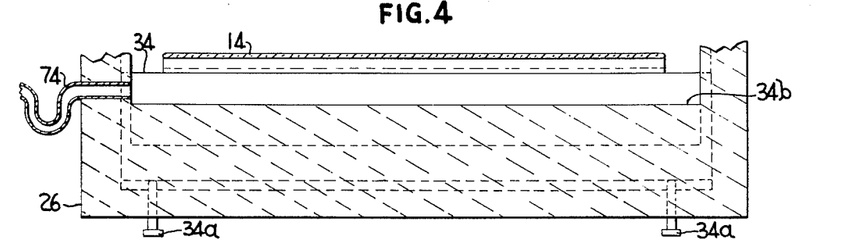
FIG. 4 is a sectional view taken on line 4—4 of FIG. 1 and in the direction of the arrows showing a liquid metal level control structure at the entrance end of the molten metal tank.
Figure 5:
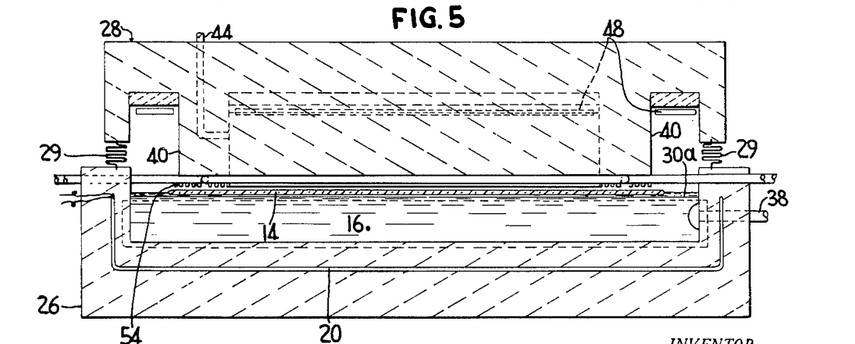
FIG. 5 is a sectional view taken on line 5—5 of FIG. 1 and in the direction of the arrows showing a wall and seal construction between the entrance and heating zones of the metal bath tank.
Figure 6:
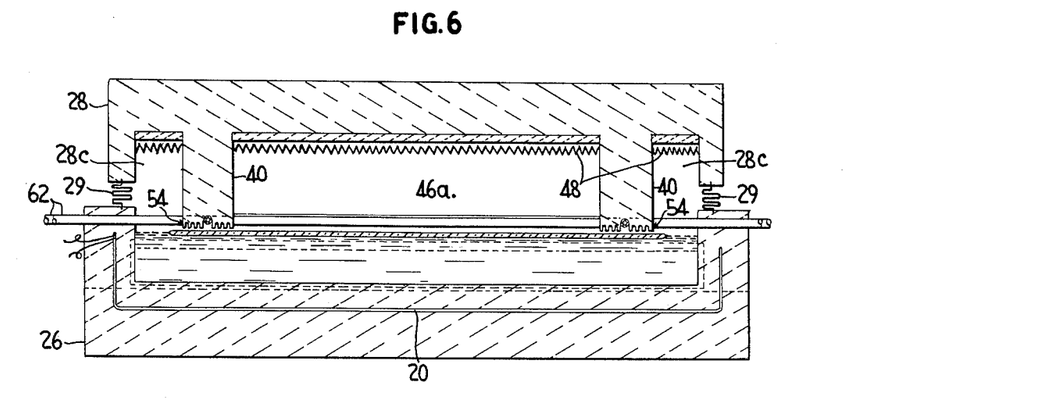
FIG. 6 is a sectional view taken on line 6—6 of FIG. 1 and in the direction of the arrows showing the surfacing zone and a tank wall construction.
Figure 7:
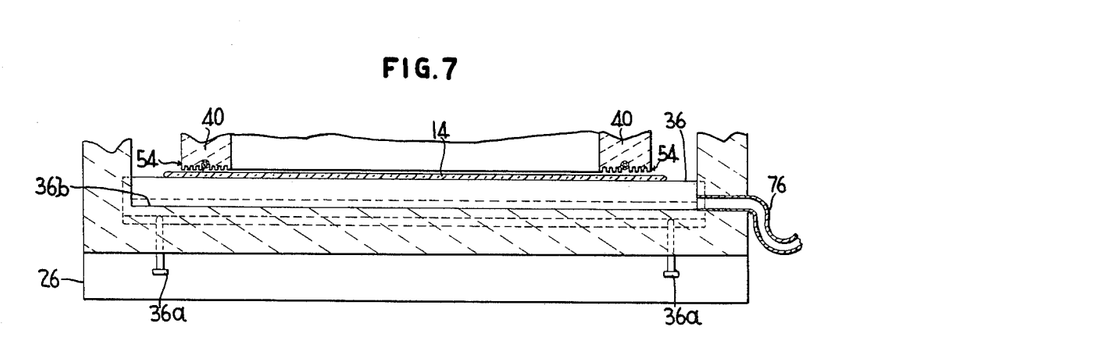
FIG. 7 is a sectional view taken on line 7—7 of FIG. 1 and in the direction of the arrows showing a molten metal level control structure at the exit end of the molten metal tank.
Figure 8:
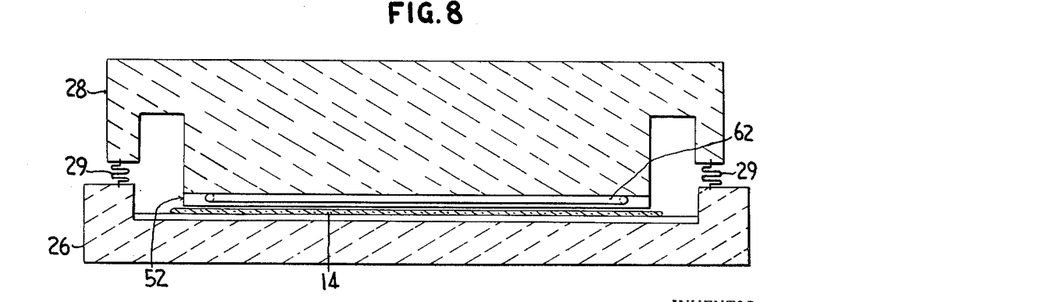
FIG. 8 is a sectional view taken on line 8—8 of FIG. 1 looking in the direction of the arrows showing the exit seal of the molten metal tank and indicating traction means for withdrawing the ribbon of glass.
Figure 9:
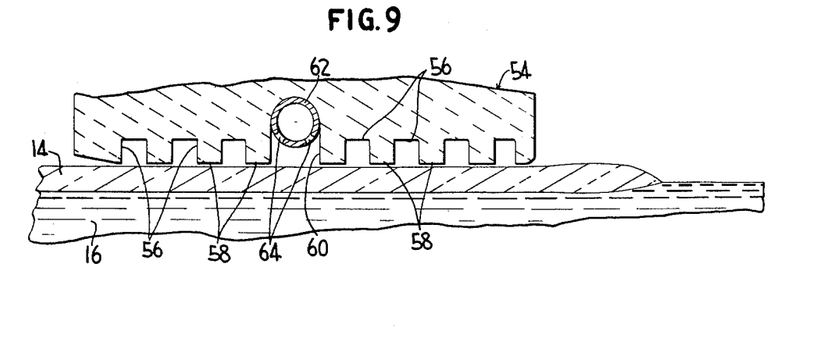
FIG. 9 is an enlarged view showing in detail the seal structure for the glass ribbon edge portions.

The level control means for controlling the level of the molten metal in the bath 16 includes the weirs 34 and 36 and the inlet 38. The weirs 34 and 36 are plates of a refractory material slideable within slots formed in the tank refractory parts. The weirs are vertically adjustable by suitable means, as screws 34a and 36a, respectively (FIG. 4), so as to adjust the molten metal level depending upon the thickness of glass being produced. Each weir defines one side of a trough 34b and 36b, respectively (FIG. 7), the other sides and bottoms of the troughs being defined by walls of the tank 18 or other suitable refractory material. Conduits 74 and 76 pass through the walls of the tank 18 and communicate at one end with the troughs 34b and 36b, respectively. Each conduit is connected to discharge molten metal into a sump (not shown) for regeneration and reheating and from which molten metal is pumped to the tank 18 through the inlet 38. Each conduit 74 and 76 is provided with a trap, i.e., a U-bend in the conduit, so as to prevent the entrance of atmospheric air into the tank 18 which would cause oxidation of the metal of the bath.

In the operation of this device a ribbon of glass is formed by passage of molten glass between a pair of forming rolls 12 from a source thereof, such as a conventional glass melting tank, and the ribbon 14 is delivered to the front section of the tank 18 passing through the front or entrance seal 50.

Gas which is inert to the metal is fed into a pipe 62a and flows downwardly impinging against the glass and thereby isolates the interior of the tank 18 from the outside atmosphere. A similar gas is supplied to the plenum chamber 70 under pressure high enough to cause the gas in this chamber to flow through the orifices into the grooves 66 and to hold the ribbon away from the solid parts of the tank. Inert gas is fed into chamber 26a and 26c to maintain an inert atmosphere therein. Further gas is fed into chamber 26a to establish a gas pressure therein which is above that of chamber 26c.

In general this gas is preheated by means not shown to a temperature sufficiently high to prevent undue cooling of the glass. Normally, the temperature of the gas supplied to pipe 62a and chamber 70 will be above 500° to 1000° F. and often in the range of 1400° F. up to a melting temperature of the glass.

After the ribbon 14 has entered chamber 28a it is laid upon the surface of the molten metal and is led through the seal 54 into the chamber 28b.

As shown in the drawings, the ribbon 14 has a width greater than that enclosed by the wall 40 thus providing a narrow margin which extends beyond the edges of the wall 40 into the chambers 28c. Sealing gas is delivered to the pipes 62, disposed in the wall 40 and caused to impinge against the edge portions of the ribbon 14 which is immediately below the walls 40, thereby separating the chamber 28b from 28c by a gaseous curtain. This gas is supplied at a pressure equal to or greater than the pressure established on each side of the curtain. The temperature of the gas supplied to front section and side sections of these walls in front of baffle 46a generally should approximate a melting temperature of the glass or at least should be high enough so as to avoid cooling the ribbon edges below a melting temperature.

The ribbon 14 while floating on the metal surface advances through the chamber 28b and finally is withdrawn from the tank 18 passing through the seal 52. It is pulled from the tank between the traction rolls 22 which may, if desired, or if necessary, exact enough tension upon the ribbon to keep it moving.

As the ribbon 14 passes through the chamber 28b, the temperature is maintained high enough to cause the ribbon to become molten during a substantial distance of its path. During this time the surfaces of the ribbon smooth out and the ribbon seeks an equilibrium thickness the magnitude of which is dependent upon the pressure established within chamber 28b.

The pressure required in the chamber 28b depends upon the thickness desired and the external pressure, i.e., the pressure in the chambers 28c into which the edges of the ribbon extend. Where it is desired to produce a ribbon thinner than the aforesaid equilibrium thickness, i.e., about 0.27 inch, the pressure in the chamber 28b should be at least 0.01 ounce per square inch above that pressure at the edges of the molten ribbon, e.g., in the chambers 28c.

For example, the ribbon tends to stabilize at a thickness of 3/16 inch when the pressure differential is 0.11 ounce per square inch.

The degree of stabilization is a function of time. Consequently, it is readily possible to produce glass 0.125 inch in thickness simply by sizing the thickness of the ribbon at this thickness or slightly lower, subjecting the sized ribbon to the treatment herein contemplated at a suitable pressure of about 0.2 ounce per square inch, which includes improving its surfaces, and removing the sheet before its thickness can grow unduly.

In general, the pressure differential established between the chamber 28b and that at the edge of the sheet or ribbon ranges from 0.01 to 2 ounces per square inch. Higher differential pressures normally are unnecessary and may be difficult to maintain. They should in no event be so high as to cause the ribbon to break and rarely are above 5 to 10 ounces per square inch. Little flow of gas from chamber 26c tends to take place after the pressures have been established because of the low pressure differentials involved.

The temperature established in the fore part of the chamber 28b is a melting temperature of the glass of the ribbon. Toward the end, i.e., beyond baffle 46a the temperature is reduced low enough to ensure delivery of a stable ribbon which is not marred by contact with rolls to the discharge end of the tank, for example 600 to 800° F. or below.

The rate of movement of the ribbon over the pool is controlled so as to ensure a smoothing of the surfaces of the ribbon and in general this is best accomplished by bringing a section of the ribbon to molten state.

It will be understood that the gas discharged through pipes 62 along walls 40 is supplied at a pressure or at a velocity sufficient to maintain the pressure differential between chambers 28b and 28c. As previously explained the gas which is discharged in this way beside areas where the ribbon is being heated to or is held at a melting temperature, is heated to a temperature substantially that of the glass. On the other hand at the farther ends of the chamber, e.g., beyond baffle 46a, the ribbon is cooled and gas supplied to pipes 62 along these portions of walls 40 normally is substantially cooler, rarely above the temperature of the portion of ribbon opposite such wall portions and may advantageously be much lower in temperature.

EXAMPLE I

A ribbon of glass of convenient width, for example 12 inches or more, having a composition, by weight, of 71.38 percent $SiO_2$, 13.26 percent $Na_2O+K_2O$, 11.76 percent CaO, 2.54 percent MgO, 0.75 percent $Na_2SO_4$, 0.15 percent $Al_2O_3$, 0.11 percent $Fe_2O_3$ and 0.06 percent NaCl and a weight density of 2.542 grams per cubic centimeter is formed by a pair of rolls to a thickness of substantially .125 inch and delivered at 1400° F. and floated upon the surface of a molten bath of metal of 100 percent tin having a weight density of 6.52 grams per cubic centimeter at 1800° F. The tank of molten metal is of the construction illustrated in the drawing and is longitudinally divided into three sections, an entrance section the metal of which is maintained at a temperature of 1500° F., a melting section the metal of which is maintained at a temperature of 1900° F. and a cooling section in which the metal is at a temperature ranging from 1900° F. to 1000° F. The space above the metal is subdivided into two pressure chambers and pressurized gas is fed to each chamber. The gas is preheated to 1900° F. for this supply. The first chamber 28a is maintained at slightly above atmospheric pressure while the second chamber 28b is maintained at 0.5 ounce per square inch gauge pressure, so that a pressure differential of 0.2 ounce per square inch existed between the two chambers.

The width of the ribbon is greater than the width of the second chamber so that the margins of the ribbon extend laterally beyond the outer side edge of the chamber. The pressure over the extending margin is atmospheric. The glass is heated from above to a temperature of 1900° F. in the second chamber to remelt the ribbon throughout its entire thickness in a section across the entire width of the ribbon under the chamber and is then cooled to 1000° F. at the exit of the molten metal tank after which it was withdrawn from metal contact. The ribbon thickness remains at substantially .125 inch and the surfaces are fire-finished and flat except for the edges which are bulbed. The general contour of the cross-section of the resulting ribbon is diagrammatically established in FIG. 13. As therein shown, the ribbon has a central essentially flat relatively thin section A with two bulbed or widened edge portions B, the edge portions having knife edges C.

The interior and exterior of the second chamber are separated by a gas curtain as illustrated in the drawing wherein the gas is delivered at a pressure of 0.5 ounce per square inch.

EXAMPLE II

A circle of glass having a diameter of 10 inches and a thickness of 0.194 inch, whose composition was by weight 73.00 percent $SiO_2$, 13.24 percent $Na_2O+K_2O$, 8.44 percent CaO, 3.53 percent MgO, 0.42 percent $Na_2SO_4$, 1.28 percent $Al_2O_3$ and 0.09 percent $Fe_2O_3$ with a density of 2.501 grams per square centimeter was preheated to 700° F. and centrally placed on a bath of molten tin (100 percent) having a density of 6.52 grams per square centimeter at 1800° F. within a furnace. The glass floated on the surface of the molten tin. A cup-shaped graphite head 7.82 inches in diameter having a cavity 7.37 inches in diameter was lowered so that the lower extremities of its walls were within 0.004 inch from the surface of the glass on the bath. A gas inert within respect to the glass and the tin and composed of 93 percent nitrogen and 7 percent hydrogen by volume, with a dew point of minus 70° C. was preheated to approximately the same temperature as the bath in the heating chamber and was fed centrally to the head into the cavity enclosed by the walls thereof. Leakage between the walls and the glass occurred, so that the gas was fed into the head at 0.46 ounce per square inch and this pressure was maintained in the cavity. The area outside the head within the furnace was pressurized by the leakage to a pressure of 0.29 ounce per square inch. The pressure differential of 0.17 ounce per square inch between the interior and exterior of the head was maintained for this example.

The glass and the tin bath were heated simultaneously to 1800° F. at a rate of approximately 340° F. per hour and were held at 1800° F. for 20 minutes. The glass and the tin bath were then cooled to 700° F. at a rate of approximately 200° F. per hour. The glass was then removed from the bath without damage.

The glass circle thickness was measured and was found to have a marginal portion approximately 7.37 inches in inside diameter, 0.247 inch in thickness, and a center portion depressed to a diameter which ranged from 0.150 inch at its edges to 0.180 inch at its center. The bottom of the glass exhibited a smooth flat surface. The top surface exhibited a fire-polished finish.

Various other embodiments of the process may be practiced. For example, the ribbon may be supplied substantially at melting temperature to the molten metal, held molten for a period and then gradually cooled.

Furthermore, the pressure in chamber 28b may be lower than the pressure in 28c. In this case the ribbon tends to stabilize at a thickness greater than the equilibrium thickness. Thus, a sub-atmospheric pressure may be imposed in chamber 28b to establish a differential pressure between 28b and 28c of 0.01 to 2 ounces per square inch to produce thicker sheets substantially according to the following table:

| Pressure of 28c minus pressure of 28b: | Stabilizing thickness, inch |
|---|---|
| 0.05 ounce per square inch | 0.31 |
| 0.10 ounce per square inch | 0.34 |
| 0.20 ounce per square inch | 0.42 |

EXAMPLE III

A circle of glass 10.82 inches in diameter and 0.242 inch thick having a composition by weight of 73.00 percent $SiO_2$, 13.24 percent $Na_2O+K_2O$, 8.44 percent $CaO$, 3.53 percent $MgO$, 0.42 percent $Ma_2SO_4$, 1.28 percent $Al_2O_3$ and 0.09 percent $Fe_2O_3$ and a density of 2.501 grams per square centimeter was placed into a furnace and centrally disposed on a bath of molten 100 percent tin having a density of 6.52 grams per square centimeter and floated thereon spaced from the walls enclosing the bath. The glass was at room temperature, and the tin bath was at 700° F. The molten tin was protected against oxidation by an inert gas which was composed of 93 percent nitrogen and 7 percent hydrogen by volume, with a minus 70 dew point and which had been preheated to the same temperature of the molten tin.

A cup-shaped graphite head of 7.82 inches in diameter and having a cavity of 7.37 inches in diameter and walls 2.5 inches in height was lowered so that the lower extremities of its walls were within 0.004 inch of the surface of the glass thus forming an inner chamber and an outer chamber with the glass protruding from the inner to the outer chamber. The inert gas was delivered to the outer chamber so as to escape across the space between the wall extremities of the head and the metal into the cavity and be discharged centrally through the roof of the cup. The pressure in the outer chamber was maintained at 0.16 to 0.19 ounce per square inch and in the inner chamber was maintained at 0.05 to 0.07 ounce per square inch, so that a pressure differential of 0.11 ounce per square inch existed between the two chambers. The glass was initially spaced from the walls of the head and floated on the metal.

The furnace and its contents were heated to 1800° F. at approximately 330° F. per hour and held at 1800° F. for 20 minutes.

The furnace and its contents were allowed to cool naturally to 700° F. and the glass was removed from the bath and the furnace.

The glass after removal measured 10.44 inches in diameter and had a central portion which was 7.37 inches in diameter, 0.327 inch in thickness and which had a surrounding edge portion 0.244 to 0.260 inch in thickness. The bottom surface of the glass was substantially flat and the top surface of the glass exhibited a fire-finished surface.

In lieu of molten tin or tin alloy, other stable molten materials having a greater density than the glass of the ribbon may be used including: lead, lead-zinc alloys, lithium or the like and metal salts such as copper chloride, lead chloride, and like materials which have a density above about 2.5 and are stable, essentially non-volatile, liquids at the melting temperature of the glass treated.

While the use of an intermediate gas partition is an effective seal, it will be understood that other means may be resorted to. For example, the lower ends of walls 40 may be disposed so close to the top of the ribbon that substantial leakage does not occur and the desired pressure differential can be maintained.

The width of the ribbon may vary with variance in thickness. For example, where thicker sheets are desired the ribbon need not extend beyond the outer edges of the walls 40 since the gas supplied from pipes 62 provides the differential pressure required. In this case the gas supplied in this way can generate a super-atmospheric pressure profile at the edges of the ribbon and the chamber 28b can be held at atmospheric pressure.

In the foregoing process, as illustrated by Example I, a presized ribbon is subjected to treatment to produce a ribbon of substantially the original thickness. In such a process the edges which are subject to the lower pressure gradually thicken to assume the contour illustrated in FIG. 13. In consequence the ribbon narrows. The original width of the ribbon and chamber 28b must, of course, be wide enough to compensate for this narrowing so that the seal is not broken and the pressure released therein. Alternatively, the chamber 28b may be tapered in width in the direction of movement of the glass to compensate for this narrowing of the ribbon. A substantial period of time is required for this narrowing bulb formation to take place. This necessitates a relatively long molten bath.

According to a further embodiment of this invention and as discussed above, the ribbon fed to chamber 28b may be preformed to assume by a positive shaping operation the contour resembling the ultimate shape of the ribbon. Thus, the ribbon may be preformed to have thicker edges than the thickness of the central portion thereof. Preferably, the thickness of these edges should be less than that which will develop at equilibrium under the fluid pressure applied to the edges but more than the ultimate thickness to be achieved in the central portion of the sheet so that some edge growth can take place. For example, if a ⅛ inch sheet is to be obtained, the ribbon may be preformed to have a central thickness of substantially ⅛ inch and edges of 0.150 to 0.125 inch.

As described in Example III thick glass can be produced which has relatively thin edges. Such a sheet will have the contour shown in FIG. 14 which includes a thick central portion D, and tapering edge portions E terminating in knife edges F. Glass of this contour may be preformed and supplied to the pressure chamber 28b, the thickness of the edges in this case usually being slightly more than the equilibrium thickness at the edge pressure so that some edge thinning can take place in the processing.

Figure 13:
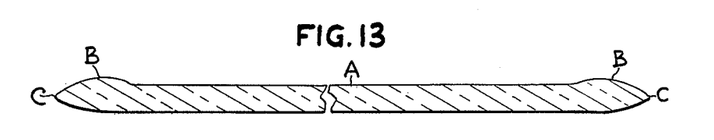
FIG. 13 is a cross-sectional view of a ribbon taken transversely of the ribbon which is formed and/or subjected to treatment as herein contemplated.
Figure 14:
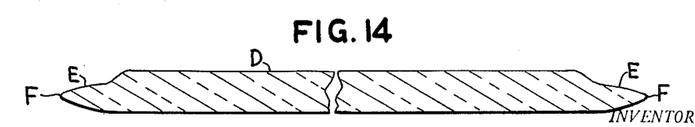
FIG. 14 is a cross-sectional view of another ribbon taken transversely of the ribbon which is formed and/or subjected to treatment according to another embodiment of the invention.

The edge portions of either ribbon, i.e., that of FIG. 13 or that of FIG. 14, are less than 20 percent of the width of the ribbon.

In each case the ribbon is disposed so that the edges remain in contact with the atmosphere in chambers 28c while the interior passes under atmosphere of chamber 28b, the edges of the chamber being registered with the edges of the ribbon to ensure this result.

Recourse to a ribbon having the thickened edges herein described offers several advantages. First, since the initial ribbon has a contour which will approach at the equilibrium when the edges are at a lower pressure than the central area, the ribbon can be processed to a good finish more rapidly. Second, the provision of the thickened edges or rolls provides a simple method of steering the ribbon. Thus, the edges may be gripped or engaged by rolls downstream after the sheet has solidified and cooled to a point where rolls do not mark the glass and the sheet steered or centered on the molten bath by transverse forces. The thickened edges absorb such transverse stresses more readily, thus making the steering easier. This advantage accrues even when the ribbon in plastic state is supported on gas as well as liquid.

According to a further embodiment of this invention two thicknesses of glass may be simultaneously produced by applying one pressure to one portion and another pressure to another. For example, chamber 28b may have a width of only a fraction, say one-half of the width of the glass, so that a substantial continuous width 20 inches or more is under atmospheric pressure in chamber 28c. In such a case glass in 28c will be about one-quarter inch while under 28b it will be thinner, for example, one-eighth or three-sixteenths inch. Other thicknesses can be produced by subdividing the pressure chamber longitudinally and supplying each subdivision with a different gaseous pressure. Of course, if a uniform thickness of glass is desired, all pressure chambers can be supplied with the same gaseous pressure.

In the embodiments previously described, there is a seal arrangement 54 between the pressure chambers which includes means for discharging a gaseous fluid onto the glass ribbon and across the lands of the seal. Other types of seals may be used for isolating one pressure chamber from the other.

One type of pressure chamber arrangement which may be used employs a liquid immiscible with the metal of the bath, and having a density less than that of the metal of the molten bath, so as to float on the bath. The liquid also has a density less than the glass, so that glass will not float thereon. The liquid must not wet the glass even at the elevated temperatures encountered. Typical liquids are molten alkali metal salts, such as alkali metal chlorides or fluorides.

When a liquid, such as described, is used for perfecting a seal between pressure chambers, the partition walls 40 separate the pressure chambers from one another. The lower terminal edge of the partition wall 40 is spaced from the surface of the glass being treated. The liquid, such as an alkali metal salt, is floated on the metal bath to a depth sufficient to contact the lower terminal edge of the partition wall at least when displaced by the ribbon of glass being surfaced or treated in the apparatus, and thus prevent gas leakage between pressure chambers.

Another sealing arrangement utilizes a material such as graphite which is not wet by the glass at the elevated temperatures encountered. Graphite can be utilized for the pressure seal arrangements 50 and 52 as well as the arrangement 54. To effectively use graphite for a seal arrangement, it is only necessary to face the terminal edge portions of the walls 40 or replace the lands and grooves of the pressure seal arrangements 50 and 52 with the graphitic material. The thickness of the graphitic material is chosen so as to just contact the ribbon or be just slightly spaced from the ribbon.

In the embodiments previously described the glass ribbon is presized or preformed by means of mating forming rolls after which the ribbon is delivered to the molten bath for treatment.

It is also possible to preform and/or presize the ribbon by extruding molten glass through an extrusion nozzle either onto an apron arrangement and then onto the molten metal bath or directly onto the molten metal bath. In the former, the mating forming rolls would be replaced by the extrusion nozzle having an opening conforming to the desired cross-section of the ribbon, as for example, of uniform thickness or with bulbed enlarged edges. The nozzle should be constructed of a material capable of withstanding the extremely high temperatures involved and of such material that is not wet by the glass. Graphite or graphitic materials meet the requirements and are preferred.

When the apron arrangement is dispensed with, then the front wall of the tank 18 may incorporate the extrusion nozzle having its desired cross-section. Again, graphite or graphitic material may be used for the nozzle. With this arrangement it will be readily understood that the entry pressure seal arrangement 50 of the previous embodiments can be eliminated and also the pressure chamber 28b may extend the full length of the tank 18, so that the walls 42 terminate at the front wall of the tank 18. The baffle 30a would thus also be eliminated.

Another alternative method of forming the ribbon of glass is to discharge molten glass from a spout directly on the molten metal bath. This would entail a slight increase in length of the tank 18 to accommodate the formation of the ribbon. Of course, the molten glass would accumulate, in the absence of pressure control, as a ribbon of equilibrium thickness and thereafter while passing through the pressure chamber 28b would either be reduced in thickness or grow in thickness depending upon the pressure differential maintained between the pressure chambers.

Although the present invention has been described with reference to certain specific details, it is not intended that such details shall be regarded as limitations upon the scope of the invention except insofar as included in the accompanying claims.

I claim:

1. In a process of producing glass wherein the glass is supported on a liquid having a density greater than that of the glass, the improvement which comprises floating a layer of glass at its melting temperature on a portion of the surface of said liquid and subjecting the upper surface of a central area of the glass to a fluid pressure which is greater than the pressure on the liquid at an edge of the glass.

2. In a process of producing glass sheet wherein the glass is supported on a liquid having a density greater than that of the glass and the glass when molten and allowed to flow freely on said liquid tends to naturally attain an equilibrium thickness, the improvement which comprises floating a layer of glass at its melting temperature on a portion of the surface of said liquid, subjecting an area of the upper surface of the glass within the edges thereof to a gas pressure, and subjecting liquid outside and in contact with the glass to a fluid pressure of different magnitude than that of said gas, thereby controlling the thickness of the glass within the edges thereof so as to be different from said equilibrium thickness.

3. The process of claim 2 wherein the gas pressure on said glass area is above the fluid pressure on the liquid so as to produce a glass area of a thickness less than said equilibrium thickness.

4. The process of claim 2 wherein the pressure on said glass area is below that on the liquid at an edge of the glass.

5. A method of treating glass which comprises floating a ribbon of glass on a portion of the surface of a pool of molten metal, maintaining a selection of the floating glass across the ribbon at its melting temperature, and applying a fluid pressure to the upper surface of a central area of said section within the sides thereof which is greater than the fluid pressure on the pool at the sides of said section.

6. In a process of producing glass wherein the glass is supported on a liquid having a density greater than that of the glass and the glass when allowed to flow freely tends to naturally attain an equilibrium thickness which comprises, forming a ribbon of glass, floating the formed ribbon on a portion of the surface of a bath of liquid, heating the ribbon so that it becomes a molten layer of glass and continuing to float the molten glass on said liquid, applying a super-atmospheric pressure to a portion only of the upper surface of said layer of molten glass within the edges thereof while being heated, and applying a gas pressure of different magnitude to liquid outside and in contact with the glass, thereby controlling the thickness of the glass to which the gas pressure is applied so as to be different from said equilibrium thickness.

7. In a process of producing a ribbon of glass wherein the glass is floated on a portion of the surface of a liquid bath so as to have a fire-finished surface, the improvement which comprises, forming a ribbon of a predetermined thickness less than that naturally occurring when molten glass is floated on the liquid bath, advancing the glass ribbon along the surface of the liquid bath under heat conditions which transform the ribbon into a layer of molten glass, applying a gas pressure to an area of the glass within the edges thereof, applying a gas pressure of different magnitude to liquid outside and in contact with the glass, controlling the differential in pressures so applied to maintain the predetermined thickness of the glass which is different from that naturally occurring in the absence of the modification, then cooling the glass to set it at the predetermined thickness, and removing the so-cooled glass from the liquid bath.

8. In a process of producing a ribbon of glass wherein the glass is floated on a portion of the surface of a liquid bath so as to have a fire-finished surface and the glass when allowed to flow freely tends to assume an equilibrium thickness, the improvement which comprises, advancing the glass ribbon on the surface of a liquid bath under heat conditions which transform the ribbon into a layer of molten glass, applying a gas pressure to the upper surface of the glass within the edges thereof, applying a gas pressure of different magnitude to liquid outside and in contact with the glass, controlling the difference in pressure so applied to bring the glass to a predetermined thickness different from said equilibrium thickness obtainable in the absence of the pressure differential, and then cooling the glass at its predetermined thickness and removing the so-cooled glass from the liquid bath.

9. In a method of treating glass wherein a glass ribbon is supported upon a portion of the surface of a liquid bath, the steps comprising, forming a ribbon of a predetermined size having a thickness different than that which tends naturally to be formed when molten glass is supported on the liquid bath, depositing said ribbon upon and advancing it along said liquid bath while first remelting the ribbon throughout its thickness and thereafter cooling said ribbon to a temperature at which its dimensions become stable, exerting a gas pressure upon at least a portion of the unsupported side of the ribbon within the edges thereof during remelting and exerting a gas pressure of different magnitude on the liquid outside and in contact with the glass, the difference between the gas pressures being sufficient to reduce the tendency of the dimensions of said ribbon to change.

10. In a process of producing glass sheet wherein the glass is supported on a liquid having a density greater than that of the glass and the glass when molten and allowed to flow freely on said liquid tends to naturally attain an equilibrium thickness, the improvement which comprises floating a layer of glass at a temperature at which it flows on a portion of the surface of said liquid, subjecting an area of the upper surface of the glass inwardly of the edges thereof to a fluid pressure, and subjecting a marginal area of the glass and liquid immediately outside the marginal area thereof to a fluid pressure of different magnitude from said first named fluid pressure, thereby controlling the thickness of the inward area of the glass so as to be different from said equilibrium thickness.

11. The process of claim 10 wherein said layer of glass floated on said liquid has longitudinal edge sections of a thickness differing from that inwardly of said edges and said second named fluid pressure is greater than said first named fluid pressure.

12. The process of claim 10 wherein said layer of glass floated on said liquid has longitudinal edge sections of a thickness differing from that inwardly of said edges and said second named fluid pressure is less than said first named fluid pressure.

13. The method of claim 9 wherein said ribbon is formed with a thickness less than that which tends naturally to be formed when molten glass is supported on the liquid bath.

14. The method of claim 9 wherein said ribbon is formed with a thickness greater than that which tends naturally to be formed when molten glass is supported on the liquid bath.

15. Th process of claim 11 wherein said layer of glass floated on said liquid bath is formed with said longitudinal edge sections greater in thickness than said inward area thereof.

16. The process of claim 10 wherein said layer of glass floated on said liquid is formed with longitudinal edge sections of a thickness different from the thickness of said inward area and wherein each thicker portion of said layer of glass is subjected to a fluid pressure which is below the fluid pressure applied to the thinner portions thereof.

17. In a process of producing flat glass wherein the glass is supported on a liquid having a density greater that that of the glass, the improvement which comprises,
supporting a layer of glass at its melting temperature on a portion of the surface of said liquid,
subjecting an area of the glass within and spaced from the edges thereof to a first pressure, and
subjecting the surface of that liquid outside and in contact with the glass to a second pressure,
said second pressure being of a different magnitude than said first pressure.

References Cited by the Examiner

UNITED STATES PATENTS

| 1,460,582 | 7/1923 | Henshaw | 65—91 |
| 1,924,599 | 8/1933 | Ferngren | 65—199 |
| 2,911,759 | 11/1959 | Pilkington et al. | 65—65 |

FOREIGN PATENTS

| 732,043 | 2/1943 | Germany. |

DONALL H. SYLVESTER, *Primary Examiner.*

UNITED STATES PATENT OFFICE

CERTIFICATE OF CORRECTION

Patent No. 3,241,939                             March 22, 1966

Edmund R. Michalik

It is hereby certified that error appears in the above numbered patent requiring correction and that the said Letters Patent should read as corrected below.

Column 1, line 25, for "flat" read -- float --; column 9, line 17, for "$Ma_2SO_4$" read -- $Na_2SO_4$ --.

Signed and sealed this 26th day of November 1968.

(SEAL)
Attest:

Edward M. Fletcher, Jr.                             EDWARD J. BRENNER Attesting Officer                                       Commissioner of Patents